(12) United States Patent
Playford

(10) Patent No.: US 6,571,571 B2
(45) Date of Patent: Jun. 3, 2003

(54) REFRIGERATION UNIT

(75) Inventor: Chris Playford, King's Lynn (GB)

(73) Assignee: Foster Refrigerator (UK) Limited (GB)

( * ) Notice: Subject to any disclaimer, the term of this patent is extended or adjusted under 35 U.S.C. 154(b) by 0 days.

(21) Appl. No.: 09/923,277

(22) Filed: Aug. 6, 2001

(65) Prior Publication Data

US 2002/0020184 A1 Feb. 21, 2002

(30) Foreign Application Priority Data

Aug. 9, 2000 (GB) .............................................. 0019600

(51) Int. Cl.⁷ ................................................ F25D 19/00
(52) U.S. Cl. ............................. 62/298; 62/407; 62/312
(58) Field of Search ......................... 62/298, 407, 312, 62/456; 312/401

(56) References Cited

U.S. PATENT DOCUMENTS

| | | | |
|---|---|---|---|
| 3,600,905 A | * 8/1971 | Dymerk et al. ............... 62/382 |
| 3,712,078 A | 1/1973 | Maynard et al. |
| 3,766,749 A | * 10/1973 | Livesay ....................... 62/262 |
| 3,866,433 A | * 2/1975 | Krug .......................... 62/229 |
| 4,471,633 A | * 9/1984 | Tinsler ........................ 62/295 |
| 4,505,131 A | * 3/1985 | Boxall ......................... 62/407 |
| 4,637,222 A | * 1/1987 | Fujiwara et al. ............... 62/244 |
| 4,711,099 A | 12/1987 | Polan et al. |
| 5,086,627 A | 2/1992 | Borgen |
| 5,310,073 A | 5/1994 | Johannsson |
| 5,544,495 A | * 8/1996 | Anderson et al. ........... 62/457.7 |
| 5,678,421 A | * 10/1997 | Maynard et al. ............... 62/407 |
| 5,722,244 A | * 3/1998 | Shelton ........................ 62/74 |
| 6,070,424 A | * 6/2000 | Bauman et al. ............... 62/279 |
| 6,094,934 A | * 8/2000 | Rand et al. .................... 62/440 |

FOREIGN PATENT DOCUMENTS

| | | |
|---|---|---|
| DE | 3134214 | 6/1982 |
| GB | 2354732 | 9/1999 |
| WO | 01/23818 | 4/2001 |

* cited by examiner

Primary Examiner—William Doerrler
Assistant Examiner—Mark S. Shulman
(74) Attorney, Agent, or Firm—Thompson Hine LLP

(57) ABSTRACT

Box for refrigeration unit, the box being formed from a moulded, hollow walled, plastics shell. The walls of the shell are filled with an insulating material. Some components of a refrigeration unit, including an evaporator, are provided within the box, other components, including a compressor, are provided outside the shell. The box can be used as a plug box for a refrigeration unit.

24 Claims, 5 Drawing Sheets

REFRIGERATION UNIT

CROSS REFERENCE TO RELATED APPLICATIONS

This Application claims priority from British Patent Application No. 0019600.6 filed on Aug. 9, 2000.

The present invention relates to a refrigeration unit, for example for use in a refrigerator or freezer for storing food, or for other cooling applications and chambers for cooling items. In this specification, the term refrigeration unit is used to describe the components that achieve cooling, and the term refrigerator covers the cabinet or compartment that is cooled or frozen by the cooling of the refrigeration unit.

Most commercial refrigeration systems make use of the vapour compression refrigeration cycle for cooling. This relies on the compression-condensation-expansion-evaporation cycle of refrigerant fluid. Essentially, a refrigerant fluid is expanded, for example by passing this through a throttle, thereby reducing the pressure and consequently the boiling point of the refrigerant fluid. In this state, the refrigerant fluid is able easily to evaporate and thereby absorb heat energy. In particular, heat energy can be absorbed from the refrigerator. The resulting superheated, vaporised refrigerant is then compressed in a compressor. This compression increases the pressure of the refrigerant fluid, thereby increasing its boiling point. The resulting high-pressure vapour is then condensed, causing the refrigerant fluid to give up the heat energy absorbed during the evaporation. This heat energy is emitted to the atmosphere. The refrigerant fluid, having given up all of the absorbed heat energy, is then again expanded by the throttle, reducing the pressure and therefore enabling the refrigerant to absorb further heat energy as it is evaporated as the cycle is repeated.

To make use of this cycle, a conventional refrigeration unit comprises an evaporator over which the air within the refrigerator cabinet is blown and through which expanded, low pressure, refrigerant fluid is passed. The refrigerant absorbs heat energy from the air, and therefore reduces the temperature within the cabinet. The refrigerant is then conveyed from the evaporator to a compressor where the fluid is compressed, and the resulting high-pressure vapour is condensed within the condenser, causing the absorbed energy to be dissipated from the refrigerant fluid to the atmosphere.

In many commercial refrigeration systems, the refrigeration cabinet is formed with an opening in the top through which the air is cycled and cooled. It has been known since the early 1980's to locate the components of the refrigeration unit in a plug-in box that is mounted as a single component on top of the cabinet to allow communication with the interior of the cabinet for cooling the air in the cabinet. This has the advantage that, in the event of failure of the refrigeration unit, it is possible merely to replace the entire plug-in refrigeration unit as a single component.

There are a number of problems with the use of such unitary, plug-box type refrigeration units. Firstly, such boxes are difficult and time consuming to construct. As the air from within the refrigeration cabinet passes through the plug-in box to allow cooling of the air, it is important that the box gives good thermal insulation to prevent heat from the atmosphere warming the air within the chamber. Therefore, it is usual to form the box in a similar way to the rest of the refrigerator cabinet, namely to form an outer metallic shell, an inner metallic shell spaced from the outer shell, and to fill the void between the inner and outer shells with an insulating foam material. This assembly requires the separate formation of the inner and outer shells, and the installation of spacers to ensure the required spacing between the shells. The opening between the inner and outer shells must then be sealed, for example using tape, to ensure that the void is properly filled with foam to the required density for the insulation properties required. There is a special need for good seals due to the high pressure required to inject the insulating foam to the required density. Furthermore, the high pressure used means that both the inner and outer skins must be supported during foam filling. Once the shell has been filled with the insulating foam, other components, such as baffles, must be installed individually within the box for directing airflow through the unit and past the evaporator. Components must also be added to support the parts of the refrigeration system, such as the evaporator, fans and tubes. Holes must be formed through the shell to receive the tubing for the refrigerant and power lines for the electrical components. These components cannot be installed prior to foam filling due to the need to support the inside shell during high-pressure foam filling. Accordingly, there are a large number of individual components that must be installed separately, resulting in a lot of time spent in assembling the unit. This results in a significant cost.

A second problem is that the each of the components used in the refrigeration unit itself, such as the condenser, fan, evaporator, must be individually installed in the unit, and attached to the shell by bolts or the like. Each of these components must individually be sealed to prevent any leakage of refrigerant or of the air being cooled. Again, this is time consuming and results in high manufacturing costs.

A third problem is that the design of the inside of the unit is limited due to the use of sheet metal to form the unit, and due to the need to mount components of the refrigeration unit within the box. In particular, this limits greatly the control of airflow through the unit, preventing optimisation of this. Also, it is difficult to ensure airtight seals, and so there is a risk of leakage from the desired flow path.

A fourth problem with existing designs is apparent when the units require repair. Whilst the use of a plug box allows the unit as a whole to be removed easily for replacement, in many cases it is preferred to merely repair or replace individual failed components, or to gain access to remove debris. As the boxes are formed with an open bottom, through which air flows from and to the refrigeration cabinet via the open top of the cabinet, but with solid sides, back, front and top, the only way to service the unit is through the bottom opening. When the unit is installed, this means that the only access to the inside of the unit, without removing this from the cabinet, is from the inside of the refrigerator cabinet. This means that it is necessary to empty the refrigerator cabinet to allow access to the inside of the unit. This may be inconvenient, for example in a busy kitchen where there may be nowhere else to store the contents of a refrigerator that is being repaired. Even where it is possible to empty the refrigerator, it is difficult to work inside the unit due to the limited access.

According to a first aspect of the present invention, a box for a refrigeration unit comprises a moulded, hollow walled, plastics shell, the walls of which are filled with an insulating material.

According to a second aspect of the present invention, a refrigeration unit comprises a first heat exchanger for absorbing thermal energy in fluid communication with a second heat exchanger for dissipating the absorbed thermal energy, and a means for blowing fluid to be cooled into or over the first heat exchanger such that a refrigerant passing through the first heat exchanger absorbs thermal energy from the fluid, in which the first heat exchanger is located within a box according to the first aspect of the present invention, the box further including a first opening through which the fluid to be cooled can enter the box to the heat exchanger, and a second opening through which the cooled fluid can exit the box.

An advantage of the use of a moulded plastics box is that the box may be formed automatically as a single component. This greatly reduces the amount of time required to build the box, and therefore greatly reduces the cost of manufacture of the box. A further advantage of moulding the box as a single unit is that there is no need to seal joints between components forming the box as is required with boxes formed of sheet material to ensure that the shell can be filled without leaking of the insulation material. This has the advantage of reducing the manufacturing time, both as it avoids the need to manually seal the joints and as there is no need to spend time cleaning the excess foam that leaks from the box, and reduces material costs as there is reduced wastage of insulation material.

Preferably the shell is formed by a rotational moulding technique. In such a moulding technique, a mould is formed having surfaces corresponding to the desired surfaces of the shell, and this is filled with granulated plastics material from which the shell is to be formed. The mould is then heated, causing the plastics material in contact with, or close to, the surface of the mould to melt. During this period, the mould is rotated slowly about three axes. This ensures that the molten plastics material evenly coats the surface of the mould. The mould is then cooled and the plastics shell removed. Using rotation-moulding techniques allows the shell to be accurately formed with the required wall thickness. This is especially advantageous for the later fixing of components to the shell.

The box is preferably formed with an upper opening, closeable with a separate lid. This is of considerable benefit as it allows access to the inside of the box for repair or replacement of the components of the refrigeration unit from above a refrigerator cabinet on which the unit is installed. The advantages of this are firstly that there is no need to empty the contents of the refrigeration cabinet before access to the inside of the refrigeration unit can be achieved, and secondly as access from above the unit is much less awkward than through the open bottom of the unit as is required by the prior art. Where the plug box is made from sheet metal shells filled with foam, it is difficult to form the box with a separate lid, and in particular to form the box with a separate lid that maintains the desired thermal properties of the unit. In particular, it would be difficult to form an opening in the shell box into which a lid can be fitted, and difficult to form a suitable lid with the required insulation which can be reliably fitted into the opening. It is for this reason that the prior art plug boxes have been formed with a solid top, and a bottom opening that is not sealed, through which both the air from the cabinet passes and through which access to the inside of the unit can be made. Where the box is formed with a separate lid, the lid is preferably also formed as a hollow plastics shell, preferably by rotation moulding, filled with insulation to give the required thermal properties.

An advantage of forming the box with a separate lid is that the components of the refrigeration unit may more easily be placed in position. This is of particular advantage for the pipes interconnecting the components inside the box with those outside. By providing recesses for the pipes in the top of the wall of the box that are covered by the lid, the pipes, even when connected to further components, may merely be lowered into place. This compares to the conventional arrangement where pipes would need to be fed carefully through small holes in the shell wall, making fitting of pipes and components a very difficult and time-consuming operation.

The box preferably includes an exposed portion or platform for those parts of the refrigeration unit which require exposure to the atmosphere, in particular the second heat exchanger. The second heat exchanger is required to dissipate heat from the refrigerant fluid. It is therefore important that these components of the second heat exchanger are separated from the first heat exchanger that extracts heat from the fluid into the refrigerant. The components of the refrigeration unit mounted outside the shell are preferably mounted on a substrate, and the substrate is mounted to the exposed portion or platform of the box.

Advantageously, the first heat exchanger includes an evaporator through which the refrigerant passes, the refrigerant absorbing thermal energy as this is evaporated. An expander may be provided upstream of the evaporator to decrease the pressure, and therefore the boiling point, of the refrigerant.

The second heat exchanger preferably comprises a condenser to condense the refrigerant and thereby dissipate heat. A compressor may be provided upstream of the condenser to increase the pressure and boiling point of the refrigerant.

The plug box is advantageously formed with air guides that are arranged to direct fluid, usually air, from the refrigeration cabinet over the first heat exchanger provided within the plug box and back into the refrigeration cabinet. The air guides preferably include a funnel to direct the air from a large area towards a fan or other means for passing the fluid to the first heat exchanger. The use of a moulded plastics box has a considerable advantage over sheet metal boxes in this regard in that they permit much greater freedom of design for the air guides that is not possible with sheet metal boxes. Further, as the box is moulded as a single unit from plastics material, this ensures that there is no leakage of air as may be the case for a sheet metal box, and therefore all air drawn from the refrigeration chamber passes over the heat exchanger before being returned to the cabinet.

To minimise the energy required to circulate the air, the heat exchanger advantageously has a large surface area, thereby minimising the pressure difference across the heat exchanger.

Depending upon the application, additional evaporators may be provided in the refrigeration unit, and/or additional compressors and/or condensers provided.

According to a third aspect of the present invention, a refrigerator comprises a cabinet to be cooled, the cabinet having an upper opening, and a refrigeration unit according to the second aspect of the present invention mounted above the upper opening, such that, in use, air from within the cabinet is passed into the refrigeration unit where the air is cooled, and from which the cooled air is returned to the cabinet.

An example of the present invention will be described with respect to the accompanying drawings, in which.

Figure 1:
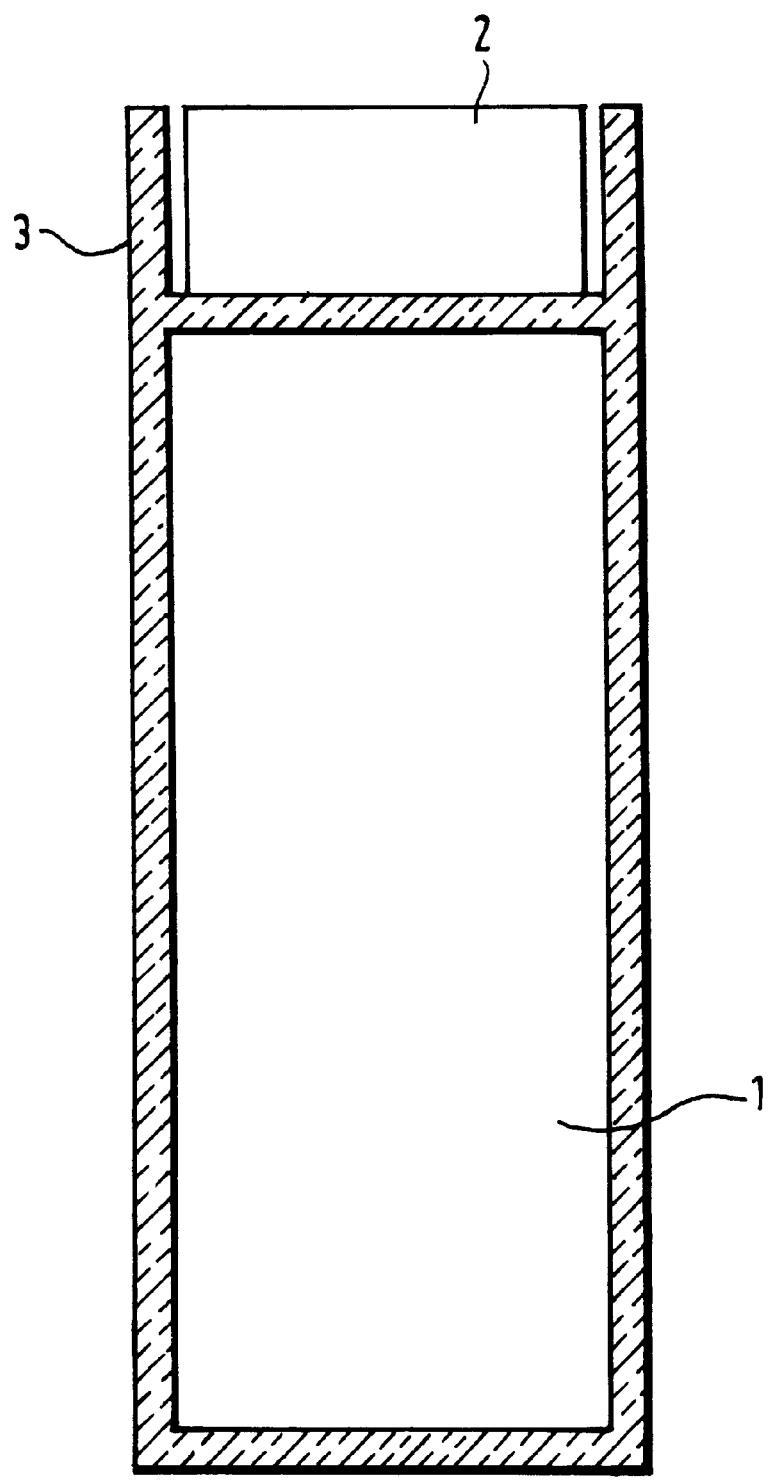
FIG. 1 shows a cross-section through a refrigerator or similar device.

As shown in FIG. 1, a refrigerator or similar device such as a freezer includes a shell or carcass 3, usually formed from an inner liner and outer shell of sheet metal, the void between the liner and shell being filled with insulating material. The carcass 3 defines a main refrigeration compartment 1 that forms the cold storage area. On top of the main compartment 1, the refrigeration unit that cools the air within the main compartment 1 is provided in the form of a plug box 2. The plug box 2 is a removable unit that contains or mounts all components required for the cooling of the air in the main compartment 1 as described in further detail below. In use, air from within the main compartment 1 is drawn through an opening in the top of the compartment 1 into the plug box 2 where the air is cooled before being returned to the main compartment 1. Usually, the cooled air is returned towards the bottom of the compartment 1 through a suitable pipe or channel. The cooled air then rises gradually through the main compartment 1 before it again passes into the refrigeration unit for cooling. The plug box 2 is bolted or screwed to the top of the refrigerator cabinet through holes formed in lugs on the box 2.

Advantageously, a small air gap is not left between the plug box 2 and the cabinet, since air will be unable to circulate in a small gap. Such stagnant air may result in undesirable thermal tracking. Accordingly, either the air gap is large enough that air may circulate freely, or the air gap should be filled with foam.

Figure 2:
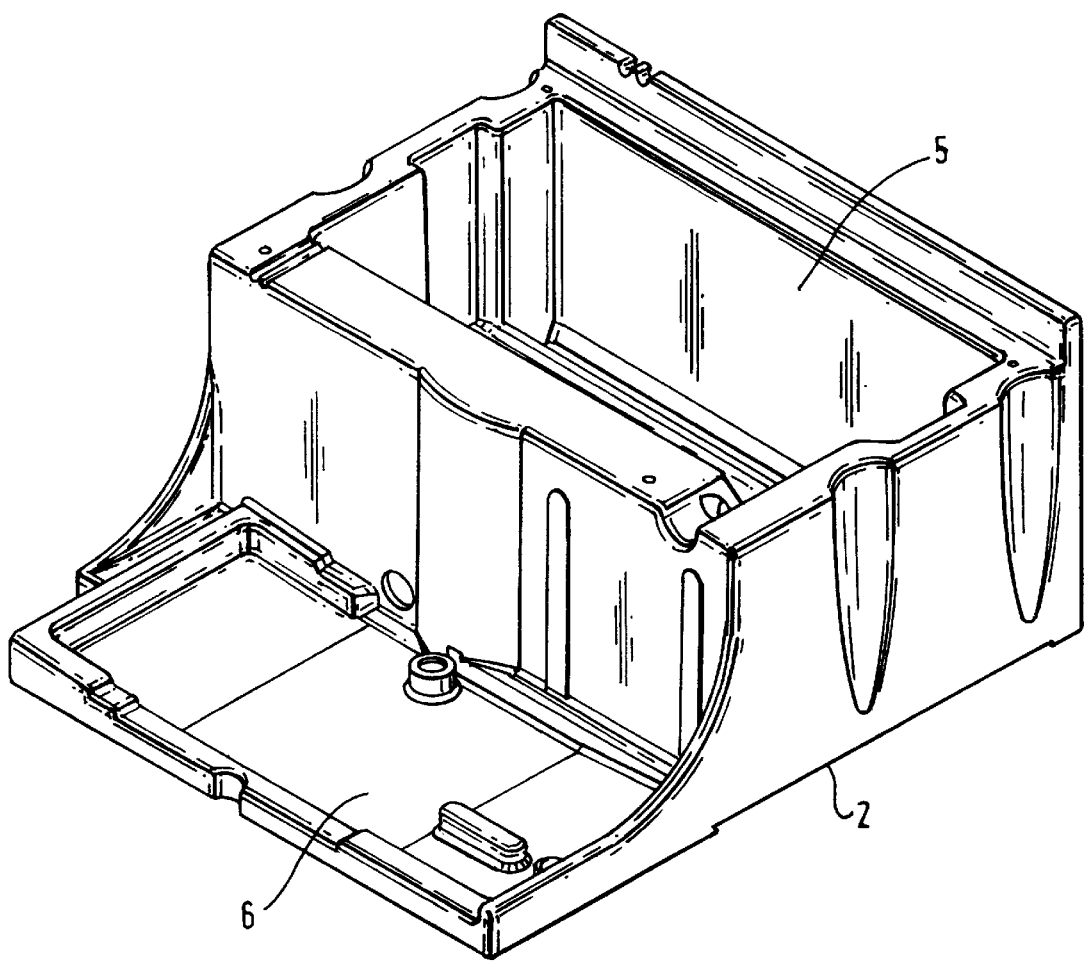
FIG. 2 shows a perspective view from the above of a plug box (with the lid removed)

FIG. 2 shows a perspective view of a plug box 2 according to one example of the present invention. The plug box 2 comprises a hollow plastics shell formed by a rotation moulding technique in which particulate plastics material is provided within a mould which is simultaneously heated and rotated to form a coating of molten plastics material on the surfaces of the mould. The mould tool is then cooled so that the plastics material solidifies, forming the hollow shell. The hollow wall of the shell is then filled with insulating foam to give the box good thermal insulation properties. The shell typically has a plastics wall thickness of around 3 mm to give the required structural stability. A separate lid is formed using a similar technique, the lid being suitable to close the top opening of the box 2.

As shown in FIG. 2, the plug box includes an exposed tray 6 for receiving the components of the refrigeration system that require exposure to the atmosphere to dissipate heat extracted from the refrigeration compartment 1, and a compartment 5, which is sealed by the lid, through which air flows from and to the main compartment 1 and in which the air is cooled by suitable means to be described below.

Figure 3:
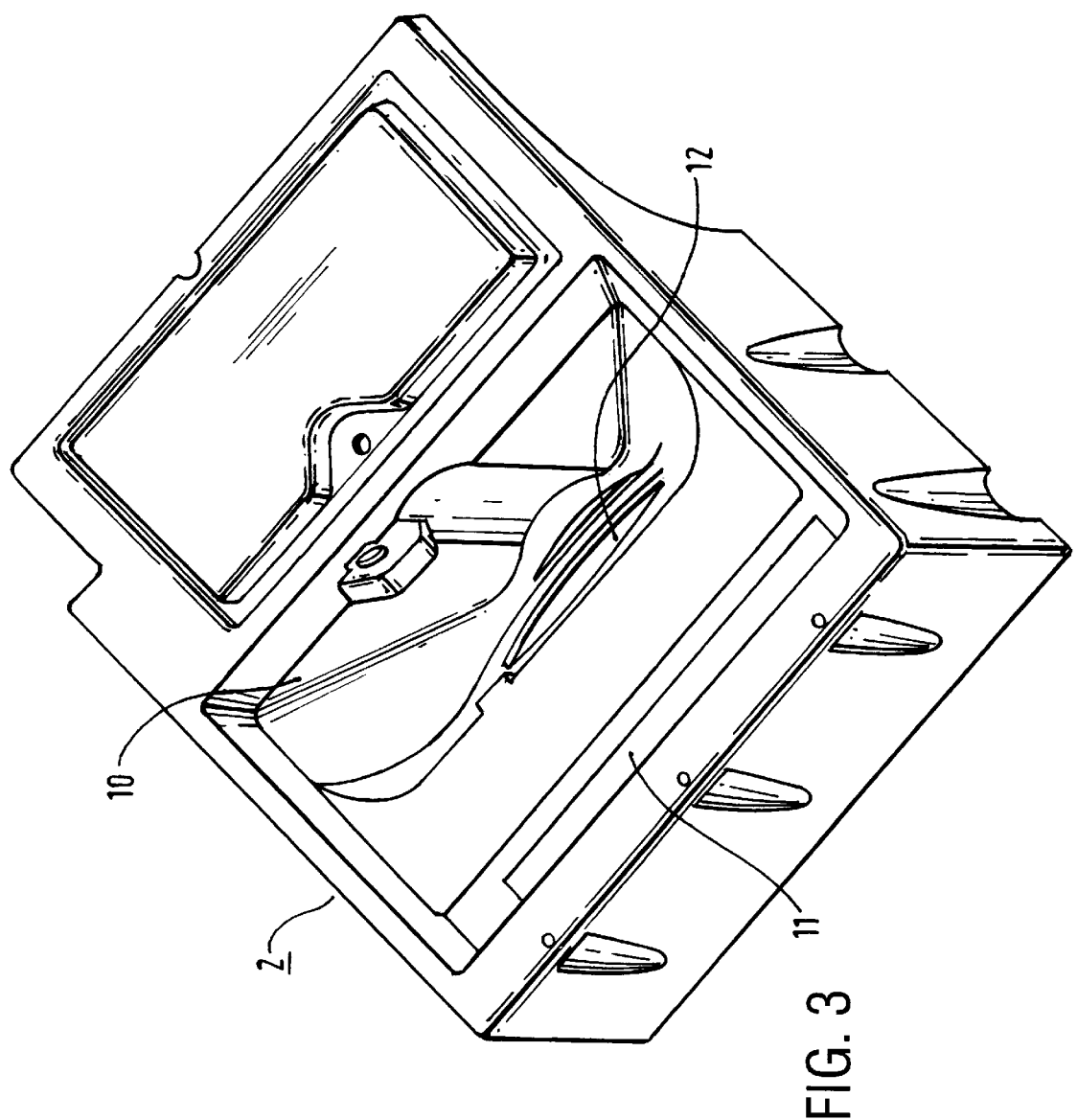
FIG. 3 shows a perspective view from the below of a plug box (with the lid removed)

As can be seen from the underneath view in FIG. 3, the bottom of the compartment 5 includes a first opening 10 though which air from the main compartment 1 is able to flow into the compartment 5, and a second opening 11 through which air passing through the compartment 5 is returned to the compartment 1. As can be seen from the upper view of the plug box 2 in FIG. 4, the compartment 5 includes a circular opening 12 that is in communication with the first opening 10. A fan is mountable in the circular opening 12 to draw air from the main compartment 1 into the compartment 5. An evaporator is mountable within the compartment 5 for cooling the air passing through the compartment 5.

For applications requiring additional or quicker cooling, provision may be made for additional fans and evaporators within the compartment 5.

The first opening 10 is shaped to funnel the airflow towards the circular opening 12 in which a fan is provided. In particular, both the sides, front and back walls of the first opening 10 are angled towards the circular opening 12. Also, as the box is formed from a moulded plastics, there is a perfect seal within the opening, such that air entering the first opening 10 must pass through the fan and over the evaporator before being returned to the main compartment 1 through the second opening 11.

As described above, a fan is mounted within the compartment 5 in the circular opening 12. As the box is formed from a plastics material, the diameter of the circular opening may be made slightly smaller than the diameter of the fan blade, or a number of projections may be provided on the inside of the opening 12, such that the fan is snap-fitted in to the opening 12 without requiring additional means of fixing. Alternatively, the fan may be screwed or bolted into place. A long thin evaporator 20 is mounted within the compartment 5. As can be seen from FIG. 4, recesses 13 are moulded into the shell 2 for receiving the evaporator 20, allowing this to be slotted into place within the compartment 5 without the need for additional fixing. A recess 14 may be provided under the evaporator 20 to collect any moisture, for example moisture condensing on the evaporator. This recess may include a small heater (not shown) to ensure that any collected moisture within the recess 14 does not freeze due to the cold air from the refrigeration compartment 1 passing over it. The collected moisture may be discharged through an outlet 16.

The remaining components of the refrigeration unit, namely the compressor and condenser 23 are provided outside the compartment 5. In particular, the remaining components are mounted on a metal support plate, which is in turn mounted on the tray 6 of the box 2. The advantage of mounting the components on a support plate rather than mounting these on the plastics moulding directly is that this permits a different arrangement of components to be achieved by simple modification of the mounting fixtures or holes on the support plate, rather than requiring a change to the mould tool from which the plastics box is formed.

Figure 4:
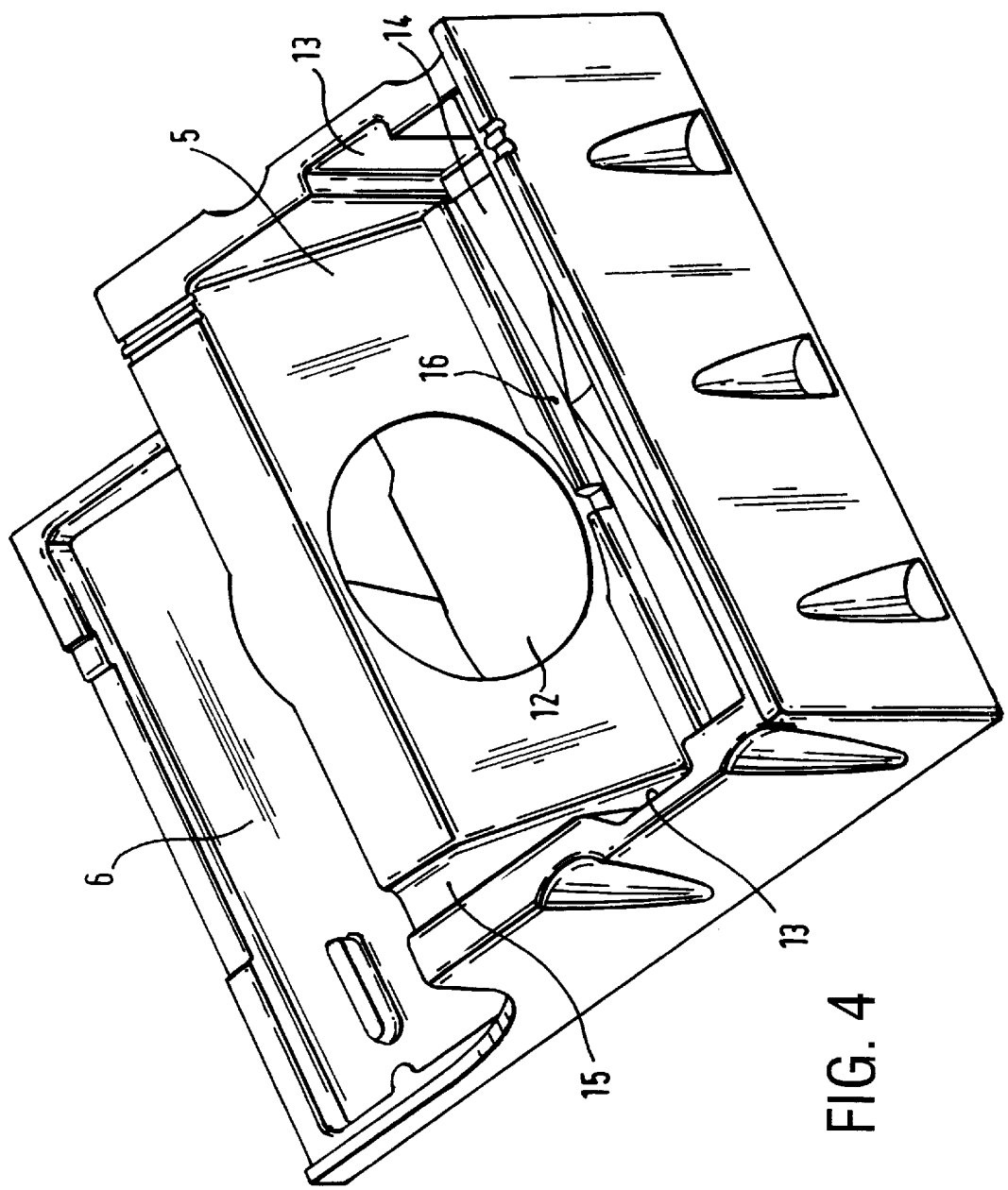
FIG. 4 shows a perspective view from the above of a plug box (with the lid removed); and, FIG. 5 is a schematic diagram showing the components of a refrigeration unit.

As can be seen in FIG. 4, a channel 15 is provided between the compartment 5 and the exposed tray area 6 of the box 2 for interconnecting pipes between the components of the refrigeration unit.

Figure 5:
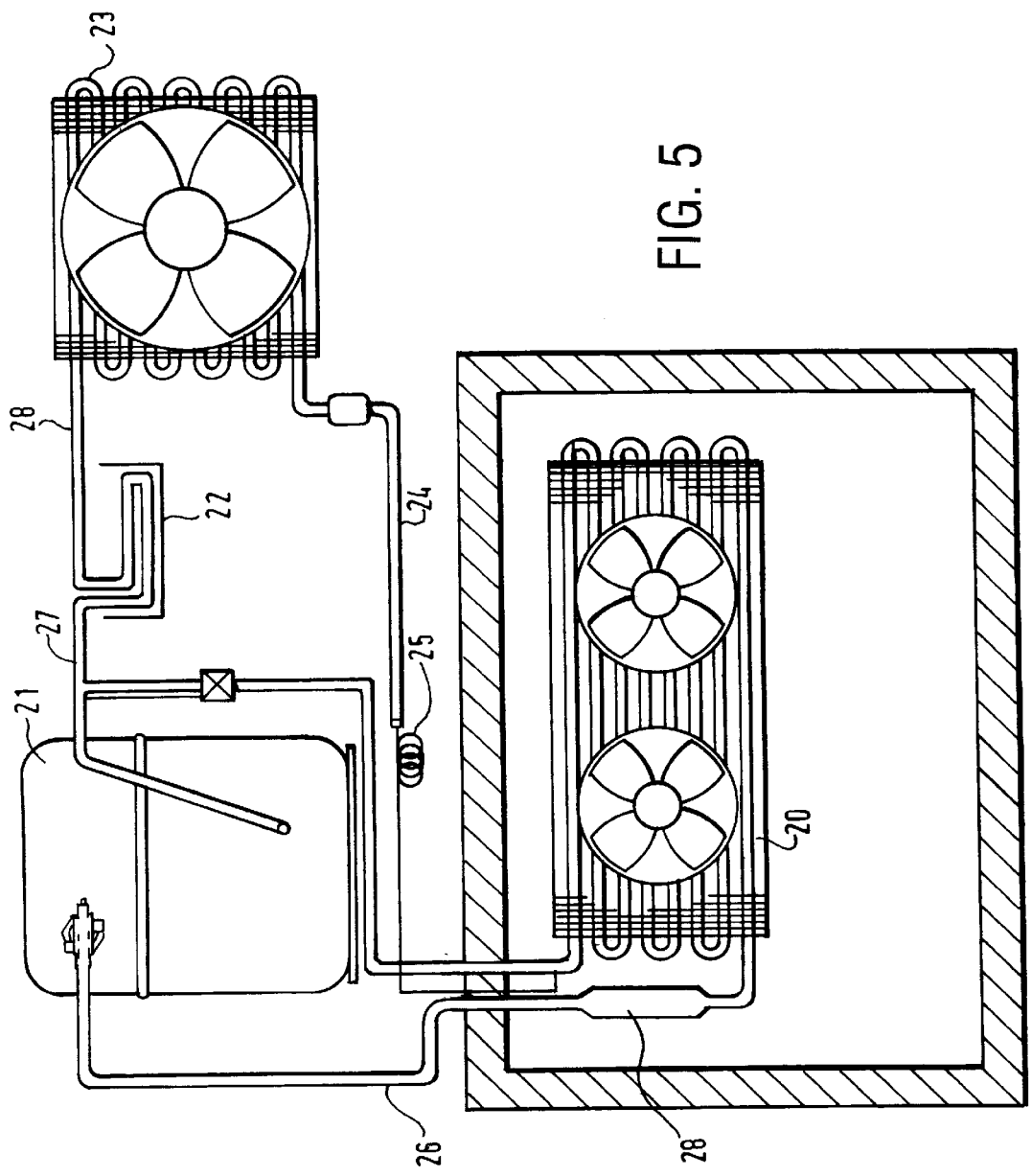

The operation of the refrigeration unit is described with respect to the schematic diagram of FIG. 5. This operation is generally conventional for refrigeration units. A refrigerant fluid is passed through the evaporator 20 within the compartment 5. The fluid is at a low pressure, such that this has a low boiling point, lower than the temperature required within the refrigerator main compartment 1. Air from within the main compartment 1 of the refrigerator is drawn through the top of the compartment 1, into the first opening 10 and through the opening 12 by the extraction fan mounted in the opening 12. The air is then blown over and through the evaporator 20. Due to the low boiling point of the fluid within the evaporator 20, heat from the air is absorbed by the fluid, evaporating this. The resulting, cooled air is returned to the main compartment 1 of the refrigerator. The continued circulation and cooling of the air as it passes through and over the evaporator 20 acts to cool the temperature within the main compartment 1.

The evaporated fluid from the evaporator then passes along pipe 26 to a compressor 21 mounted outside the compartment 5. An accumulator 28 is provided along pipe 26 to ensure that no liquid phase fluid passes to the compressor 21, as this may damage the compressor 21. Within the compressor 21, the vapour is compressed, thereby increasing the pressure of the vapour and thereby increasing its boiling point. The high-pressure vapour is then passed through a condenser 23 where the condensation of the fluid results in the reduction of the temperature of the fluid. The fluid then passes along line 24 to an expander 25 in the form of a capillary tube throttle. This expands the fluid, thereby reducing the pressure of the fluid, and again reducing the boiling point of the fluid. Then fluid then passes to the evaporator 20 to complete the cycle. Since the compressor 21 and condenser 23 both dissipate heat, these are provided outside the cooling compartment 5 of the box 2. As shown in FIG. 5, a condensate tray 22 may also be provided to collect any condensation resulting from the cold fluid passing through the tubing 27, 28 between the compressor 21 and the condenser 23. Collected condensate may be evaporated from the condensate tray 22, for example using an electric heater and/or heat derived from the refrigeration system.

What is claimed is:

1. A refrigeration unit box for attachment to a cabinet to be cooled, the box, when separate from the cabinet, comprising a moulded, hollow walled, plastic shell, the walls of which are filled with an insulating material, wherein the shell includes an insulated compartment having an upper opening, a fluid intake opening for passing fluid into the compartment and a fluid return opening for passing fluid out of the compartment, and a lid for closing the upper opening.

2. A box according to claim 1, in which the shell is formed by a rational moulding technique.

3. A box according to claim 2, in which the lid is formed as a hollow plastics shell filled with insulation to give the required thermal properties.

4. A refrigeration unit comprising a first heat exchanger within a compartment of a box according to claim 1 for absorbing thermal energy and in fluid communication with a second heat exchanger outside the compartment for dissipating the absorbed thermal energy, and a blower for blowing fluid to be cooled into or over the first heat exchanger such that a refrigerant passing through the first heat exchanger absorbs thermal energy from the fluid.

5. A refrigeration unit according to claim 4, in which the box includes an exposed portion or platform for those parts of the refrigeration unit which require exposure to the atmosphere.

6. A refrigeration unit according to claim 5, in which the second heat exchanger is provided on the exposed portion or platform.

7. The refrigeration unit according to claim 6, in which the components of the refrigeration unit mounted outside the shell are preferably mounted on a substrate, and the substrate is mounted to the exposed portion or platform of the box.

8. A refrigeration unit according to claim 4, in which the first heat exchanger includes an evaporator through which the refrigerant passes, the refrigerant absorbing thermal energy as this is evaporated.

9. A refrigeration unit according to claim 8, in which an expander is provided upstream of the evaporator to decrease the pressure, and therefore the boiling point, of the refrigerant.

10. A refrigeration unit according to claim 4, in which the second heat exchanger comprises a condenser to condense the refrigerant and thereby dissipate heat.

11. A refrigeration unit according to claim 10, in which a compressor is provided upstream of the condenser to increase the pressure and boiling point of the refrigerant.

12. A refrigeration unit according to claim 4, in which the shell includes air guides about the fluid intake opening that are arranged to direct fluid, usually air, from outside the box into the compartment and over the first heat exchanger.

13. A refrigeration unit according to claim 12, in which the air guides include a funnel to direct the fluid from a large bottom opening of the shell towards the fluid intake opening for passing the fluid to the first heat exchanger.

14. A refrigerator comprising:
a cabinet to be cooled, the cabinet having an upper opening located above the cabinet, and
a refrigeration unit mounted atop the cabinet and above the upper opening of the cabinet, the refrigeration unit, when separate from the cabinet, comprising a shell, a path for a refrigerant, the refrigerant path including, in series, an expander for decreasing the pressure of the refrigerant fluid, an evaporator downstream of the expander through which the refrigerant is passed, a compressor for increasing the pressure of the refrigerant condenser., the refrigeration unit also including a blower arranged to blow fluid to be cooled into thermal contact with the evaporator, in which the evaporator is provided within a compartment of the shell, where the shell is formed by moulded, hollow, plastic walls, the walls filled with an insulating material, the condenser being provided outside the compartment, and the compartment having a fluid intake opening for passing fluid into the compartment and a fluid return opening for passing fluid out of the compartment, the shell having a bottom opening aligned with the upper opening of the cabinet and in communication with fluid intake opening, the compartment having an upper opening with a removable lid to provide access to the evaporator such that, in use, air from within the cabinet is passed out of the upper opening of the cabinet into the bottom opening of the shell, into the fluid intake opening of the refrigeration unit compartment where the air is cooled, and out of the fluid return opening of the refrigeration unit compartment for return to the cabinet.

15. A box according to claim 1 wherein the fluid intake opening comprises a circular opening for mountably receiving a fan.

16. A box according to claim 1 wherein the shell includes a bottom opening that communicates with the fluid intake opening and is shaped to funnel fluid towards the fluid intake opening.

17. A box according to claim 1 wherein the compartment includes opposed recesses forming a slot for receiving an evaporator.

18. A box according to claim 17 wherein the compartment includes a recess below the slot for collecting moisture.

19. A box according to claim 18 wherein an outlet communicates with the recess for discharging moisture from the compartment.

20. A box according to claim 1, wherein the shell includes an exposed plastic tray extending away from one side of the compartment.

21. A box according to claim 20, wherein the one side of the compartment includes a pipe channel between the compartment and the exposed plastic tray.

22. A refrigeration unit box for attachment to a cabinet to be cooled, the box, when separate from the cabinet, comprising a moulded, hollow walled, plastic shell, the walls of which are filled with an insulating material, wherein the shell includes a compartment having an upper opening, a lid for closing the upper opening, and opposed recesses formed in the shell and extending from the upper opening downward into the compartment and forming a slot for receiving an evaporator.

23. A box according to claim 22 wherein the compartment includes a recess below the slot for collecting moisture.

24. A refrigeration unit box for attachment to a cabinet to be cooled, the box, when separate from the cabinet, comprising a moulded, hollow walled, plastic shell, the walls of which are filled with an insulating material, wherein the shell includes a compartment having an air intake opening, the shell having a bottom opening that is larger than the air intake opening, the bottom opening communicates with the air intake opening and is shaped to funnel airflow towards the air intake opening.

\* \* \* \* \*

UNITED STATES PATENT AND TRADEMARK OFFICE
CERTIFICATE OF CORRECTION

PATENT NO.    : 6,571,571 B2
DATED         : June 3, 2003
INVENTOR(S)   : Chris Playford It is certified that error appears in the above-identified patent and that said Letters Patent is hereby corrected as shown below:

<u>Column 7,</u>
Line 31, change the word "rational" to -- rotational --.

Signed and Sealed this

Fifth Day of August, 2003

JAMES E. ROGAN
*Director of the United States Patent and Trademark Office*